United States Patent [19]

Von Lersner et al.

[11] 3,797,069
[45] Mar. 19, 1974

[54] APPARATUS FOR EXTRUDING SPHERICALLY-SHAPED FOOD PRODUCTS

[75] Inventors: Wolf A. Von Lersner; Harry H. Singer, both of Cherry Hill, N.J.

[73] Assignee: Campbell Soup Company, Camden, N.J.

[22] Filed: Jan. 19, 1972

[21] Appl. No.: 218,929

[52] U.S. Cl. .................................................. 17/32
[51] Int. Cl. ............................................. A22c 7/00
[58] Field of Search ......................................... 17/32

[56] References Cited
UNITED STATES PATENTS

| | | | |
|---|---|---|---|
| 3,535,735 | 10/1970 | Egee | 17/32 |
| 3,245,106 | 4/1966 | Alderice | 17/32 |
| 3,006,291 | 10/1961 | Aquino Montez | 17/32 X |
| 3,676,897 | 7/1972 | Blanco | 17/32 |

*Primary Examiner*—Louis G. Mancene
*Assistant Examiner*—D. L. Weinhold
*Attorney, Agent, or Firm*—Donald C. Simpson

[57] ABSTRACT

Spherically shaped food products such as meatballs, dumplings, and the like are extruded onto a moving conveyor from horizontally elongated extrusion apparatus which overlies and extends transversely of the conveyor. The apparatus comprises a chamber for containing an extrudable quantity of the food product, a pair of superimposed apertured plates mounted in the bottom of the chamber for reciprocation lengthwise of the chamber, and means for reciprocating the plates. In one embodiment, the apertures in the upper plate are circular, the apertures in the lower plate are oblate, and the apertures are arranged with respect to one another so that during each cycle the apertures in the upper plate register twice with the apertures in the lower plate. As a result, extrusion is substantially continuous and pressure fluctuations in the chamber are avoided to effect greater control over the shape of the product. In another embodiment, the apertures in the plates are circular, and the apertures register with one another only once each cycle. In this embodiment, the plates are reciprocated by means of cams which control the acceleration of the plates and hence the positions of the apertures during extrusion to control the shape of the extruded products.

7 Claims, 11 Drawing Figures

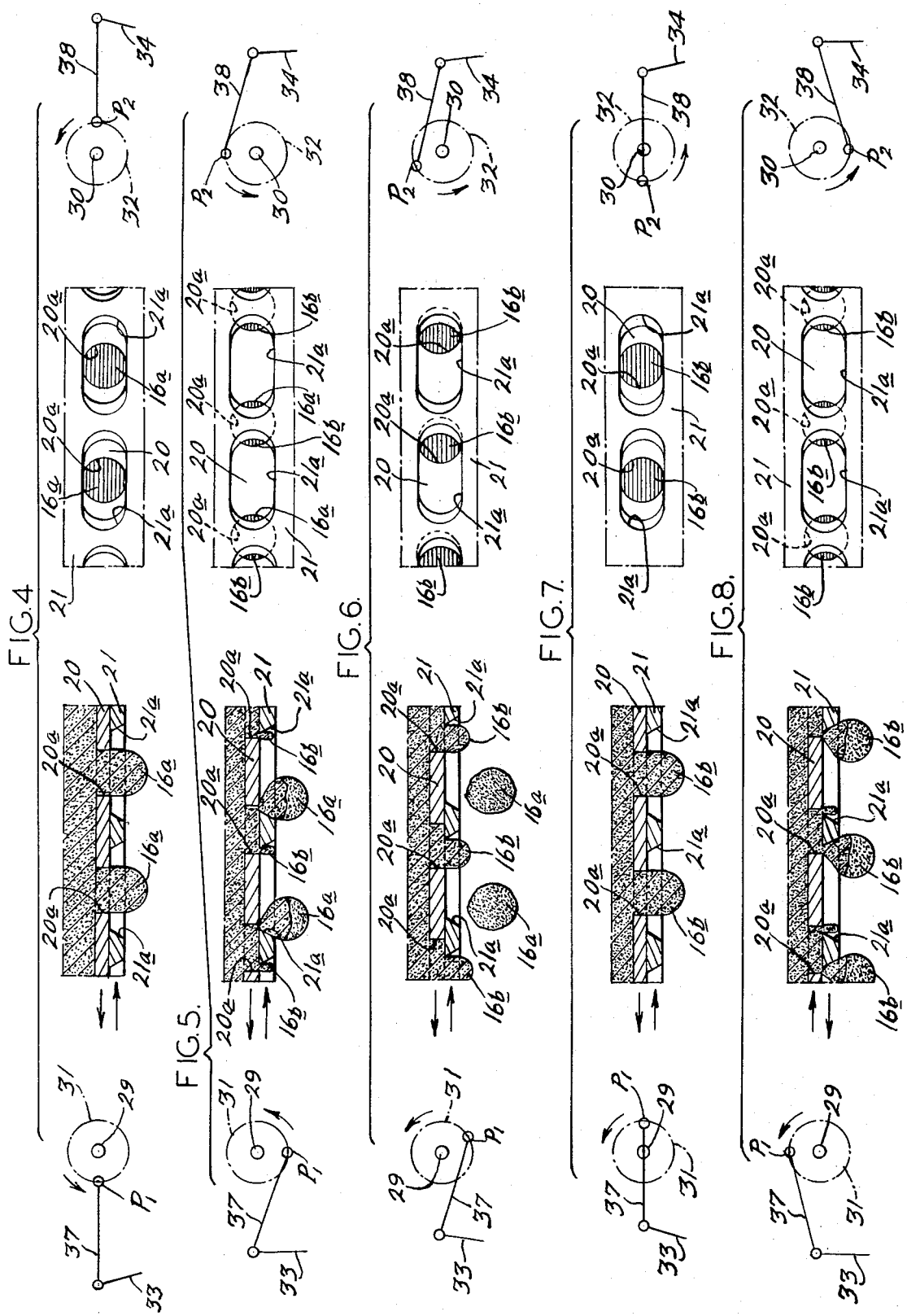

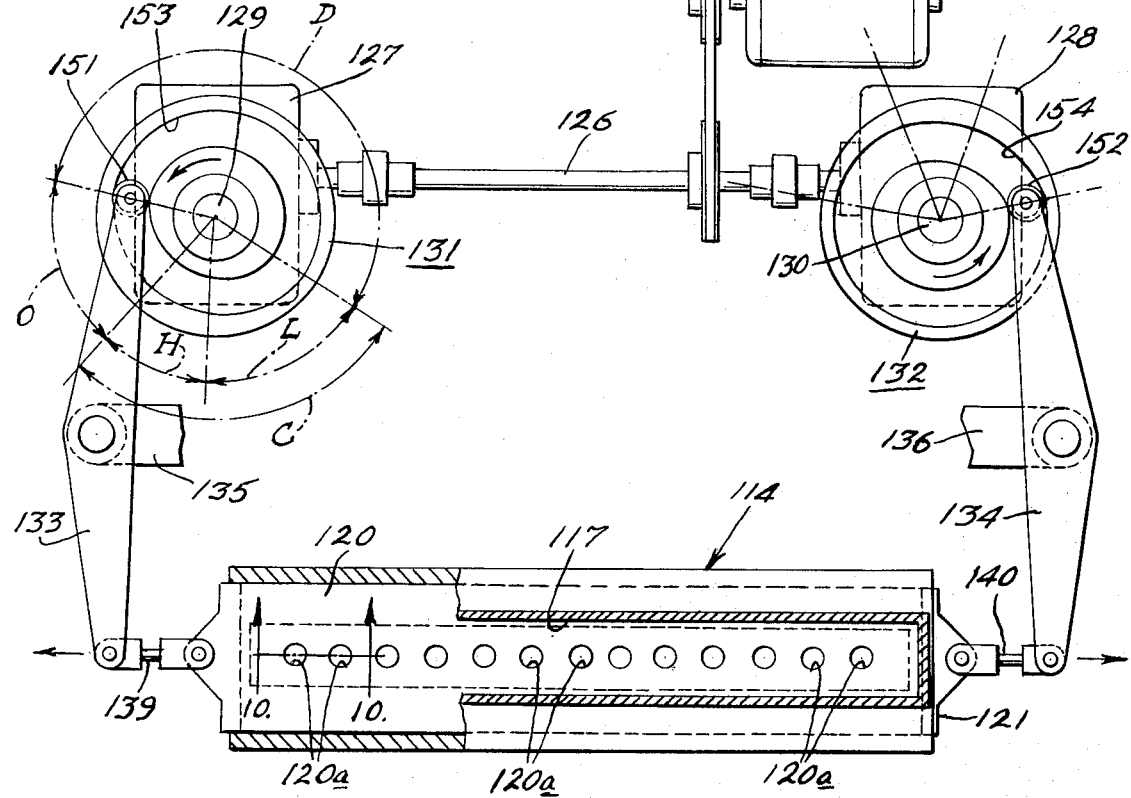
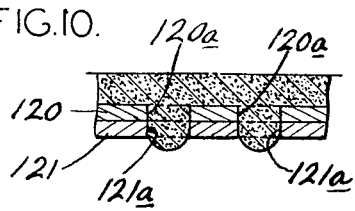
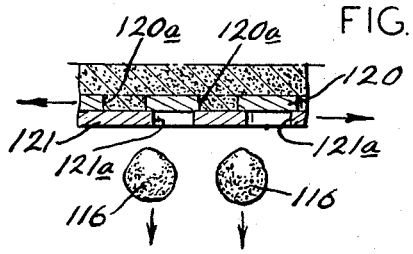

3,797,069

APPARATUS FOR EXTRUDING SPHERICALLY-SHAPED FOOD PRODUCTS

The present invention relates to apparatus for extruding shaped food products, and more particularly, the present invention relates to apparatus for extruding spherically-shaped food products such as meatballs, dumplings and the like.

Apparatus is known for extruding food products. Examples of such apparatus are disclosed in U.S. Pat. No. 3,535,735 owned by the assignee of the present application. Although the apparatus disclosed in that patent operates satisfactorily, apparatus having even greater production capacity is highly desirable.

With the foregoing in mind, it is a primary object of the present invention to provide novel apparatus for extruding spherically-shaped food products at relatively rapid production rates.

It is another object of the present invention to provide improved apparatus for extruding spherical food products onto a relatively wide moving conveyor for further processing.

As a further object, the present invention provides unique apparatus for extruding shaped food products in a manner which avoids fluctuations in extrusion pressure and thereby effects better control over the uniformity of the shape and density of the extruded products.

More specifically, in the present invention, apparatus is provided for extruding spherically-shaped food products onto a moving conveyor for subsequent processing. In its broadest aspect, the apparatus comprises means forming a chamber to contain a quantity of extrudable food product under pressure, a pair of apertured plates superimposed on one another to form the bottom of the chamber, and means to reciprocate the plates relative to one another for causing the apertures in the plates periodically to register with one another for extruding spherical food products from the chamber. In one embodiment, the apertures in the upper plate are circular and the apertures in the lower plate are oblate. The apertures in the upper plate are arranged with respect to the apertures in the lower plate as to register with adjacent apertures in the lower plate during each cycle. As a result, pressure fluctuations in the chamber are avoided and extrusion uniformity and control is achieved. In another embodiment, the apertures in both plates are circular and of the same size, and the circular apertures register with one another only once each cycle. In this embodiment, the plates are reciprocated by means of cams which are shaped to provide a dwell period during extrusion and controlled opening and closing periods for the apertures to effect uniform control over the shape of the resulting products.

These and other objects, features and advantages of the present invention should become apparent from the following description when considered in view of the accompanying drawings in which:

FIGS. 4-8 are sectional views diagrammatically illustrating sequential operating positions of various elements of the apparatus;

FIG. 9 is a view similar to FIG. 2 but of a modified embodiment of the present invention; and FIGS. 10 and 11 are views similar to FIGS. 4 and 8, but of the modified embodiment.

Figure 1:
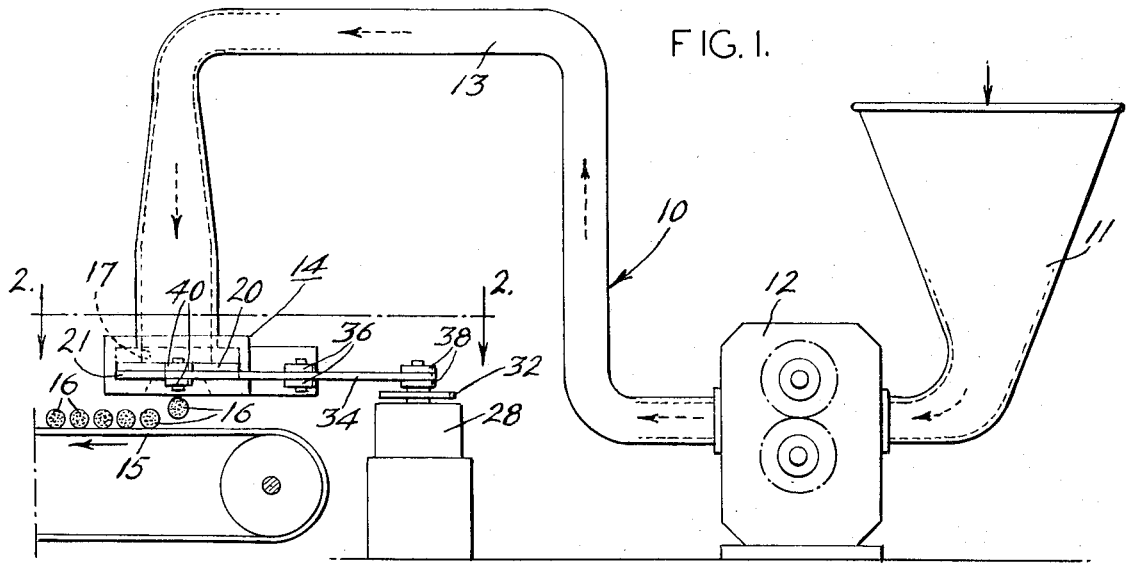
FIG. 1 is an elevational view of extruding apparatus embodying the present invention.

Referring now to the drawings, there is illustrated in FIG. 1 one form of product-forming apparatus 10 embodying the present invention. As illustrated therein, the product-forming apparatus 10 comprises a a hopper 11 for receiving a quantity of the product to be extruded, a pump 12 connected to the hopper 11 for pressurizing the product, and a conduit 13 for transporting the product to extrusion apparatus 14. A conveyor 15 underlies the extrusion apparatus 14 to accept extruded spheres, such as the meatballs 16, 16, and to convey the meatballs 16, 16 away from the extrusion apparatus 14 for further processing.

In accordance with the present invention, the meatballs 16, 16 are extruded continuously at a relatively high production rate and with relatively accurate control over their size and shape. To this end, the extrusion apparatus 14 includes a horizontally elongated chamber 17 which extends transversely of the direction of movement of the conveyor 15 and which is connected to the conduit 13 for receiving extrudable products under pressure. A pair of elongated plates 20 and 21 are mounted in superimposed relation and in engagement with one another in the chamber 17 to form the base of the chamber. The plates 20 and 21 each have apertures 20a, 20a and 21a, 21a, respectively, through which the product in the chamber 17 is extruded.

In the embodiment illustrated in FIGS. 1-8, the apertures 20a, 20a in the upper or overlying plate 20 are circular, having a diameter corresponding to the diameter of the meatball to be formed. The apertures 21a, 21a in the lower or underlying plate 21 are oblate, having semicircular edges in the plane of the plate which are connected by straight edges extending in the lengthwise direction of the plate 21. It is noted that the upper plate has web portions which extend between the edges of adjacent apertures and which are dimensioned in the direction of movement of the plates to be less than the dimension between confronting edges of the apertures in the lower plate so that the upper plate oscillates between the apertures in the lower plate as the plates are displaced between their limit positions. Preferably, the underside of the plate 21 around each aperture 21a is beveled outwardly to provide a relatively sharp cutting edge adjacent the bottom of the upper plate 20.

The meatballs 16, 16 are extruded from the apparatus 14 when the chamber 17 is pressurized and the plates 20 and 21 are displaced in opposite directions between limit positions and relative to one another. In the illustrated embodiment, the chamber 17 is pressurized by means of the pump 12, and the plates 20 and 21 are reciprocated from a common drive, such as an electric motor 25 which is connected through a common drive shaft 26 to a pair of speed reducers 27 and 28 which have vertically disposed rotary shafts 29 and 30, respectively.

Figure 2:
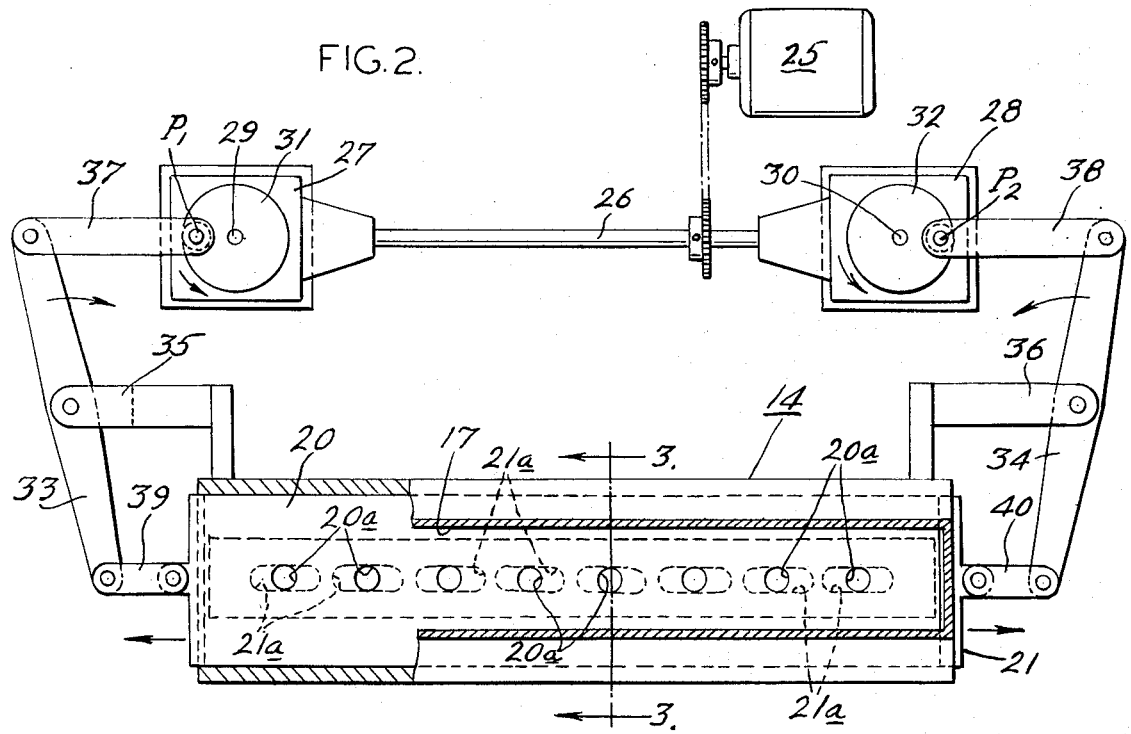
FIG. 2 is an enlarged sectional view, with portions broken away, taken along line 2-2 of FIG. 1.
Figure 3:
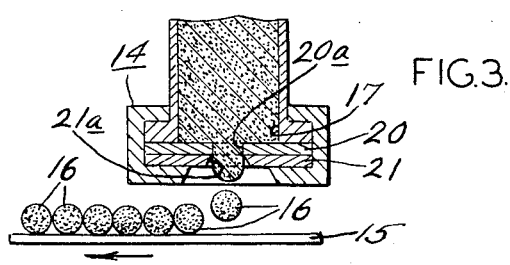
FIG. 3 is a sectional view taken along line 3-3 of FIG. 2.

In the embodiment illustrated in FIGS. 1-8, and as best seen in FIG. 2, the means interconnecting the forming plates 20 and 21 with the output shafts 29 and 30 of the speed reducers include crank discs 31 and 32 mounted on the shafts 29 and 30 and a pair of levers 33 and 34 mounted to pivot on vertical axes provided by means of fulcrums 35 and 36, respectively. One end of each lever, such as the left lever 33, is connected to the disc 31 through a link 37 which is pivotally secured to the wheel 31. The other end of the lever 33 is connected through a shorter link 39 to the upper plate 20. The right lever 34 is similarly connected to the disc 32 and plate 21 by means of corresponding links 38 and 40, respectively.

As seen in FIGS. 2 and 4, the links 37 and 38 are connected to the discs 31 and 32, respectively, to cause the apertures 20a and 21a in the plates 20 and 21, respectively, to be in complete registry with one another when the points of attachments $P_1$ and $P_2$ of the links 37 and 38, respectively, are distal or remote from one another. Moreover, as seen in FIG. 7, the apertures 20a and 21a are again in registry with one another when the points of attachment $P_1$ and $P_2$ are proximal or adjacent one another. Thus, upon each revolution of the discs 31 and 32, one circular aperture 20a registers with two oblate apertures 21a, 21a for forming two meatballs per cycle.

In addition to the advantage of forming two meatballs per cycle, the embodiment of FIGS. 1–8 possesses other advantages. For instance, the size and shape of the apertures 20a and 21a and their spacing cooperates to ensure continuous extrusion through the apertures for avoiding pressure fluctuations in the chamber 17. As a result, greater control over the shape and density of the meatballs 16, 16 is effected. The cooperation of the apertures in the plates is illustrated schematically in FIGS. 1–8, where the points of attachment $P_1$ and $P_2$ with respect to the positions of the plates 20 and 21 for various portions of the extruding cycle are illustrated. As seen in FIG. 4, the apertures 20a and 21a are in complete registry with one another and meatballs 16a, 16a are extruded when the points $P_1$ and $P_2$ are distal or remote from one another. As the discs 31 and 32 rotate in the counterclockwise directions, the points $P_1$ and $P_2$ move through the positions illustrated in FIGS. 6 and 7 to the positions illustrated in FIG. 8 where the apertures 20a and 21a are again in complete registry with one another. As the plates 20 and 21 move through the positions illustrated in FIGS. 6 and 7, the meatballs 16a, 16a are severed from the extruding chamber 17 by the shearing action of the relatively moving plates, the upper plate 20 moving leftward in the direction of its arrow and the lower plate 21 moving rightward in the direction of its arrow. It is noted that as the meatballs are in the process of being sheared, other meatballs, such as 16b, 16b are beginning to form as the plates move further relative to one another. The meatballs 16b, 16b are substantially completely formed when the plates 20 and 21 reach the position illustrated in FIG. 7, and the meatballs 16b, 16b are severed as the direction of relative movement of the plates changes, such as illustrated in FIG. 8. Since extrusion through the apertures 20a, 20a in the upper plate 20 is never completely arrested, extrusion takes place without any substantial build up of pressure in the chamber 17. As a result, variations in the shape and density of the extruded meatballs is avoided.

The linkage arrangement connecting the discs 31 and 32 to the plates 20 and 21, respectively, imparts a prescribed motion to the plates to affect the shape of the resulting product. For instance, during the shearing portion of the cycle, the plates are accelerated rapidly relative to one another and during that portion of the cycle at which extrusion of the bulk of the meatballs takes place the plates are displaced less rapidly relative to one another. Thus, controlled variations in the acceleration of the plates 20 and 21 coupled with the size, shape and spacing of the apertures 20a and 21a cooperate to produce meatballs having substantially uniform, spherical shapes.

If desired, meatballs 116, 116 may be extruded by means of the modified extrusion apparatus 114 illustrated in FIGS. 9–11. The apparatus 114 has a common drive assembly which includes a motor 125, a common drive shaft 126, and a pair of speed reducers 127 and 128. Like the reducers 27 and 28 in the first-mentioned embodiment, the speed reducers 127 and 128 have vertically disposed shafts 129 and 130, respectively. The apparatus 114 has an extrusion chamber 117 and a pair of elongated plates 120 and 121 mounted for reciprocation relative to one another in the bottom of the chamber 117. Unlike the apertures 20a and 21a in the plates 20 and 21, the plates 120 and 121 in the modified embodiment each have circular apertures 120a, 120a, and 121a, 121a of substantially the same size and spacing. However, in this embodiment, the apertures 120a and 121a register with one another only once each cycle, for instance, when the plates 120 and 121 are in one of their limit positions as illustrated in FIG. 10. When in the other of their limit positions, as illustrated in FIG. 11, extrusion is arrested, and the meatballs 116, 116 are severed from the apparatus.

For the purpose of reciprocating the plates 120 and 121, cams 131 and 132 are secured to the shafts 129 and 130, respectively, and levers 133 and 134 extend between the cams 131 and 132 to pivot on fulcrums 135 and 136, respectively. One end of each lever, such as the lever 133, is connected through a follower 151 to a peripheral groove 153 in the cam 131. The other end of the same lever 133 is connected through a link 139 to the upper plate 120. The other lever 134 is similarly connected to the groove 154 in the cam 132 by means of a follower 152 and is connected to the plate 121 by means of a link 140. Thus, rotation of both the cams 131 and 132 in the counterclockwise direction causes the plates 120 and 121 to reciprocate relative to one another.

For the purpose of controlling the shapes of the meatballs 116, 116, the grooves 153 and 154 in the cams 131 and 132 are of a predetermined configuration. For example, as best seen in FIG. 9, the groove 153 in the cam 131, which is identical to the groove 154 in the cam 132, has a constant radius of curvature for an arc of 200°. This arc corresponds to the dwell position D of the cam. When the follower 151 is in this portion of the groove 153, the apertures 120a and 121a are in registry with one another and the bulk of the meatball 116 is being extruded. The cam groove 153 also has a closing portion C and an opening portion O. The closing portion C extends through an arc of 100°, or substantially one-half the arc of the dwell portion D. The remaining extent of the groove 153 is occupied by the opening portion O. The closing portion C is subdivided into a 60° zone L of low acceleration and a 40° zone H of high acceleration. With this structure, the upper portions of the meatballs 116, 116 are shaped by the accelerating plates and a rapid cut-off of the meatballs 116, 116 is effected. Since the apertures are closed for only a brief portion of each cycle, pressure buildups in the extrusion chamber are avoided. As a result, substantially spherically shaped meatballs are produced.

In view of the foregoing, it should be apparent that there has been provided novel apparatus for extruding meatballs and other spherically shaped food products at relatively high production rates.

While preferred embodiments of the present invention have been described in detail, various modifications, alterations and changes may be made without departing from the spirit and scope of the present invention as defined in the appended claims.

We claim:

1. Apparatus for continuously extruding substantially spherically-shaped comestible products, comprising: means providing an elongated chamber having an inlet for permitting extrudable comestibles to be charged into said chamber under pressure, a pair of extrusion plates mounted in said chamber for reciprocation in opposite directions between limit positions, said plates being disposed with one plate overlying and engaging the other, and each of said plates having a series of apertures located in spaced relation therein, said apertures being spaced apart in the path of movement of the plates so that the apertures are in complete registry with one another when said plates are in their limit positions, means connected to said plates to displace said plates relative to one another, each aperture in each plate having a pair of arcuate edges confronting one another in the plane of the plate, the overlying plate having imperforate web portions extending between the edges of adjacent apertures, the web portions of said overlying plate being dimensioned in the direction of movement of the plates to be less than the dimension between the confronting edges of the apertures in the underlying plate so that the apertures in the upper plate oscillate between adjacent apertures in the lower plate as the plates are displaced between their limit positions, whereby extrusion from the apertures in the overlying plate is continuous as the plates are displaced relative to one another and fluctuations in extrusion pressure in the chamber is avoided to improve the control of the shape of the extruded product.

2. Apparatus according to claim 1 wherein said plate-displacing means includes common drive means, a pair of rotary elements driven by said common drive means, and means connecting said rotary elements to each of said plates.

3. Apparatus according to claim 1 wherein the apertures in said overlying plate are circular in shape and the apertures in said underlying plate are oblate in shape and have semi-circular edges with substantially straight lateral edges extending in the direction of movement of the plates to connect said semi-circular edges, the underlying plate being beveled outwardly of the semi-circular edges to form a sharp cutting edge immediately adjacent the overlying plate, whereby the extruded product is severed from the overlying plate with a minimum of deformation of the product as the plates move relative to one another.

4. Apparatus according to claim 3 wherein said rotary elements include shafts rotatable about vertically-spaced axes; and said linkage means includes a pair of levers, fulcrum means mounting said levers to pivot on vertical axes, and means fastening one end of each lever to one of said plates and the other end of each lever to said shafts so that rotation of said shafts in the same direction causes said plates to move in opposite directions.

5. Apparatus according to claim 4 including a crank disc mounted on each of said shafts, said lever fastening means including links connecting said levers to said discs at complimentary locations so that said plates are in their limit positions when said locations are proximal and distal one another, respectively.

6. Apparatus according to claim 2 wherein said rotary elements include a pair of cams mounted to rotate on vertical axes, and said connecting means includes a follower engaging each cam and lever means coupling said followers to said plates.

7. Apparatus according to claim 6 wherein each of said cams have a dwell zone for substantially one-half its extent to maintain said apertures in registry with one another for a period of time during extrusion and an aperture closing zone for substantially one-half of the extent of the dwell zone.

* * * * *